United States Patent Office 3,413,320
Patented Nov. 26, 1968

3,413,320
HIGH PURITY DIEPOXIDE
Kenneth B. Cofer, Pasadena, Tex., assignor to Shell
Oil Company, New York, N.Y., a corporation of
Delaware
No Drawing. Filed Mar. 14, 1960, Ser. No. 14,497
2 Claims. (Cl. 260—348)

This invention relates to a highly purified polyepoxide useful in the preparation of epoxy resins. More specifically, the invention relates to the preparation and use of free-flowing crystals of 2,2-bis(2,3-epoxypropoxyphenyl)-propane.

The compound with which this invention is concerned, 2,2-bis(2,3-epoxypropoxyphenyl)propane, is produced by the reaction of epichlorohydrin with 2,2-bis(4-hydroxyphenyl)propane. The last named phenolic compound is often referred to in industry as "p,p'-bisphenol A" or simply "bisphenol A"; these terms are at times used herein for convenience of reference. Similarly, the compound 2,2 - bis(2,3 - epoxypropoxyphenyl)propane can be conveniently designated "diglycidyl ether of bisphenol A."

The reaction of epichlorohydrin with bisphenol A to produce a complex mixture of polyglycidyl ethers of bisphenol A is well known. It is described in some detail, for example, in U.S. 2,467,171 to Werner et al. and in U.S. 2,651,589 to Shokal et al. The simplest addition product which is formed in this reaction is the 2:1 addition product, 2,2-bis(2,3-epoxypropoxyphenyl)propane, which can be represented by the formula

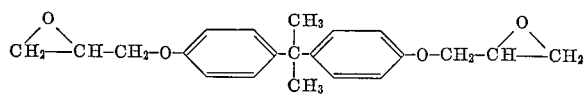

The higher molecular weight addition products which are also formed in the reaction have the general formula

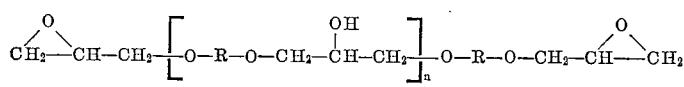

wherein $n$ is an integer and R represents the divalent hydrocarbon radical of the bisphenol. The simplest higher molecular weight product ($n=1$) is the 3:2 addition product of epichlorohydrin and bisphenol A. Still higher molecular weight products contain epichlorohydrin and bisphenol A residues in molar ratios of 4:3, 5:4 and the like. By appropriate control of the ratio of epichlorohydrin to bisphenol A in the reaction and of other reaction conditions, complex mixtures can be produced which contain a relatively high proportion of the diglycidyl ether of bisphenol A, e.g. 70% to 90% by weight or more of the total reaction product, the remainder being mainly the 3:2, 4:3 and higher addition products. However, no method has been described which permits production of the pure diglycidyl ether of bisphenol A directly by the reaction of epichlorohydrin with bisphenol A.

Attempts to produce the diglycidyl ether of bisphenol A had previously resulted only in the recovery of a relatively viscous liquid which still contained some undesirable impurities which affect adversely the utility of epoxy resins prepared therefrom for some special applications.

It has now been found that the substantially pure diglycidyl ether of p,p'-bisphenol A is capable of existing in crystalline form and it can be recovered in the form of free flowing crystals from certain concentrates of the compound by use of controlled crystallization methods. A free-flowing solid is one which exists in the form of discrete, relatively small particles which do not agglomerate into large masses and which can be readily poured from a container; examples are dry powder, dry sand, and the like. It has been found that the substantially pure crystalline product is greatly superior in a number of ways to the less pure form of the compound hitherto known. The crystalline product has a substantially better color, higher epoxy content, lower total chlorine content, lower saponifiable chlorine content, lower total hydroxide content, and lower phenolic hydroxide content; it has a lower viscosity in its liquefied state. The fact that the pure diglycidyl ether of bisphenol A is a free-flowing solid permits it to be used with much greater convenience than the impure product, which exists only in liquid form. Some particularly advantageous applications of the resin are now possible for the first time.

The liquid condensation products of bisphenol A and epichlorohydrin, described in the above-mentioned patents to Werner et al. and Shokal et al., are materials of commerce with a variety of uses. They can be reacted with various known curing agents to produce hard, cross-linked resins, so-called epoxy resins, suitable for use in molding, potting, laminating, surface protection, and the like.

The crystalline products of this invention can be combined with the same curing agents and other ingredients to produce epoxy resins which are at least equal in quality to the resins produced from the liquid condensation products and are superior thereto in some respects, e.g., in their electrical properties.

It is an object of this invention to provide substantially pure 2,2-bis(2,3-epoxypropoxyphenyl)propane in crystalline form. It is a further object to provide as a novel product of manufacture free-flowing crystals of 2,2-bis(2,3-epoxypropoxyphenyl)propane characterized by a melting point of about 43.5° C., a ratio of weight to epoxide of about 170 grams per gram equivalent of epoxide, a total chlorine content of less than 0.1% by weight, a saponifiable chlorine content of less than 0.01% by weight, a total hydroxyl content and phenolic hydroxyl content of less than 0.01 gram equivalents per 100 grams each, and a viscosity of less than 40 poises at 25° C. when in the form of supercooled liquid. Other objects of this invention will be apparent from the following description thereof.

This invention comprises a number of closely related embodiments.

In its most fundamental aspect the invention provides a novel product of manufacture, namely free-flowing crystals of 2,2-bis(2,3-epoxypropoxyphenyl)propane.

Stated more specifically, the invention provides as a novel product of manufacture free-flowing crystals of 2,2-bis(2,3-epoxypropoxyphenyl)propane characterized by a sharp melting point of about 43.5° C., a ratio of weight to epoxide of about 170 grams per gram equivalent of epoxide, a total chlorine content of less than 0.1% by weight, a saponifiable chlorine content of less than 0.01% by weight, total hydroxyl content and phenolic hydroxyl content of less than 0.01 gram equivalents per 100 grams each, and a viscosity, as a supercooled liquid, of less than about 40 poises at 25° C.

It has been found that several modifications of crystallization procedures may be employed for the recovery of crystalline diglycidyl ether of bisphenol A from concentrates thereof. Some concentrates of relatively high purity containing, e.g., over 90% of the diglycidyl ether, may yield some crystals of 2,2-bis(2,3-epoxypropoxyphenyl) propane when held at a temperature of about 25° C. for a number of days. This method may be suitable for obtaining the crystalline material for experimental purposes, but it is not a practical method of producing the crystals on a commercial scale. Useful method of producing pure crystals in larger quantities comprise dissolving a suitable concentrate of the diglycidyl ether in a solvent in which the concentrate has substantial solubility, cooling the solution to a temperature in the range from 0° to 40° C., preferably from 0° to 25° C., and adding seed crystals of pure diglycidyl ether of bisphenol A to the solution.

It has been found that the composition of the concentrate employed as starting material in the crystallization is an important factor in the success or failure in producing the crystalline diglcidyl ether of bisphenol A in useful commercial quantities. It was found, for example, that commercially produced concentrates which contain about 70 to 80% of the diglycidyl ether of bisphenol A generally are not suitable starting materials for direct crystallization from solution in solvents which are useful when proper concentrates are employed; no significant amount of crystals will be produced from such solutions even by seeding and holding at the crystallization temperature. It is believed that the diglycidyl ether of O,P′-bisphenol A and the higher molecular weight addition products of epichlorohydrin and bisphenol A which are present in such concentrates act to inhibit crystallization. When solutions of such concentrates in otherwise useful solvents are cooled it is found that there is eventually a separation of a heavy liquid phase containing the polyglycidyl ethers of bisphenol A without precipitation of crystalline diglycidyl ether of bisphenol A.

It has also been found that when special care is taken in the reaction between epichlorohydrin and bisphenol A, e.g., by using a bisphenol of high purity such as 95 to 100% instead of somewhat lower purity, e.g., of 90–93% ordinarily employed for commercial operation, or by carrying out the reaction under carefully controlled conditions including lower temperatures than those conventionally employed, it is then possible to produce a concentrate containing, e.g., 80 to 98% of diglycidyl ether of bisphenol A which concentrate may be employed without further treatment as feed stock for the recovery of crystalline diglycidyl ether of bisphenol A.

It has also been found that when a crude condensation product of epichlorohydrin and bisphenol A containing, e.g. 70–85% of the diglycidyl ether is treated by film type vacuum distillation (e.g., in a falling film or wiped film type still) to recover a distillate containing at least about 90% of the diglycidyl ether, the latter is a suitable feed stock for the direct recovery of crystals of pure diglycidyl ether of bisphenol A by crystallization from a suitable solvent. Similarly, when a concentrate containing 70–85% of the diglycidyl ether is extracted in a liquid-liquid extraction process utilizing suitable solvents, such as a mixture of 33% by weight benzene with 67% by weight n-hexane or of 20% by weight acetone with 80% by weight n-hexane, a concentrate containing at least about 90% of the diglycidyl ether is produced which is a suitable feed stock for direct recovery of crystalline diglycidyl ether of bisphenol A by crystallization from a suitable solvent.

It has been found that crystalline diglycidyl ether of p,p′-bisphenol A can be recovered in a commercially useful manner by crystallization from solution in a great number of solvents. The essential requirement is that the diglycidyl ether have a limited solubility in the solvent and that the impurities with which it is associated be soluble therein. Not all such solvents give equally good results.

Many crystallization methods and types of equipment known to the art may be used. Crystals may be recovered from the crystal slurry by decanting the liquid, filtering or centrifuging. To obtain free flowing dry crystals, the crystal cake is washed with a material which is a solvent for the adhering mother liquor while being a poor solvent or a non-solvent for the crystals at the wash temperature.

The above-named solvents may be used as wash liquids at appropriate temperatures. The greatest dimension of free flowing crystals recovered according to this invention is generally in the range of 0.02 to 0.3 mm.

The several embodiments of this invention may be better understood from the following examples. The examples are given for illustrative purposes only and the invention is not to be limited by the conditions illustrated in them.

In these examples, parts are parts by weight unless otherwise stated. Tabulated properties of uncured resins are obtained by well known standard test procedures. Viscosity is determined in the Ubbelohde Viscosimeter (compare ASTM Method D–445), Gardner color is determined according to ASTM Method D–544, using standard Gardner colored discs.

In some instances, a portion of the resin was cured in a standard manner and the cure rate of the resin and heat distortion temperature of the cured resin determined. Heat distortion temperature was determined by ASTM Method D–648 (Deflection Temperature of Plastics Under Load) on test bars of a resin cured with a curing agent consisting of aromatic amine and phenyl glycidyl ether. Cure rate was determined by measuring the gain of refractive index of a mixture of resin and m-phenylenediamine curing agent between 10 and 70 minutes after curing agent was added.

EXAMPLE 1

Seed crystals for use in subsequent crysallizations were obtained from a relatively pure liquid concentrate of diglycidyl ether of bisphenol A having the properties set out in Table 1.

TABLE 1

| | |
|---|---|
| Viscosity, poises at 25° C. | 44 |
| Weight per epoxide | 175 |
| Color, Gardner | <1 |
| Total chlorine, percent wt. | 0.37 |
| Saponifiable chlorine, percent wt. | 0.24 |
| Total hydroxyl, eq./100 g. | 0.012 |
| Phenolic hydroxyl, eq./100 g. | 0.004 |
| Resin performance: | |
|    Heat distortion temperature, ° C. | 152 |
|    Cure rate, $\Delta RI \times 10^4$ | 42 |

A portion of the concentrate was stored for several days in a water bath at 25° C. Some crystals grew on the surface of the liquid and in the thin layer of the liquid which coated the vessel above the liquid surface. The crystals were scraped and scooped off and washed free of adhering liquid.

EXAMPLE 2

The crystallization feedstock employed in Examples 3 and 4 was prepared by low pressure distillation of a commerical polyglycidyl ether of bisphenol A. The following is a representative method for the preparation of such a resin.

Bisphenol A is dissolved in epichlorohydrin in a molar ratio of about 1:10. One to two percent by weight of water is added to the resulting liquid. The mixture is then brought to 80° C. and sodium hydroxide added in small portions over a period of about one hour until two moles of sodium hydroxide had been added per mole of bisphenol A. During addition, the temperature of the mixture is held at about 90° to 110° C. After addition of sodium hydroxide is complete, the water formed in the reaction and most of the remaining epichlorohydrin are distilled off. The remaining residue is combined with an approximately equal quantity by weight of benzene and the mixture filtered to remove the salt. The benzene is then distilled off, leaving a viscous liquid having a viscosity of about 150 poises at 25° C. and a molecular weight of about 350 (measured ebullioscopically in ethylene dichloride).

The properties of the crystallization feed stock are given in Table 2.

TABLE 2

| | |
|---|---|
| Viscosity, poises at 25° C. | 167 |
| Weight per epoxide | 193 |
| Color, Gardner | 3 |
| Total chlorine, percent wt. | 0.28 |
| Saponifiable chlorine, percent wt. | 0.12 |
| Total hydroxyl, eq./100 g. | 0.064 |
| Phenolic hydroxyl, eq./100 g. | 0.008 |
| Resin performance: | |
| Heat distortion temperature, ° C. | 145 |
| Cure rate, $\Delta RI \times 10^4$ | 120 |

Portions of the commercial polyglycidyl ether of bisphenol A prepared as above were separately distilled in a wiped-film evaporator type of vacuum still and distillates recovered which have the properties shown in Table 3.

TABLE 3

| | Batch No. 1 | Batch No. 2 |
|---|---|---|
| Resin properties: | | |
| Viscosity, poises at 25° C | 55 | 78 |
| Weight per epoxide | 176 | 181 |
| Color, Gardner | 1 | 1 |
| Total chlorine, percent wt | 0.27 | 0.37 |
| Saponifiable chlorine, percent wt | 0.17 | 0.23 |
| Total hydroxyl, eq./100 g | | 0.03 |
| Phenolic hydroxyl, eq./100 g | | 0.03 |
| Resin performance: | | |
| Heat distortion temperature, ° C | 154 | 153 |
| Cure rate, $\Delta RI \times 10^4$ | 81 | 92 |

EXAMPLE 3

A crystallization experiment was carried out with a portion of the concentrate identified as Batch No. 1 in Table 3. 232 parts by weight of the distilled resin was dissolved in 931 parts by weight of methyl alcohol at 30° C. to produce a saturated solution of the resin in alcohol. One part of seed crystals obtained as in Example 1 was added to the solution and the solution was then gradually cooled in an ice bath to a temperature of 10° C. over a period of about two hours. The resulting crystals were removed by filtration. An additional one part of seed crystal was added to the filtrate which was then cooled to 0° C. resulting in the formation of additional crystals. The second portion of the crystals was separately recovered by filtration. A third fraction of the original resin was obtained by removing the methanol from the remaining filtrate by distillation. It was found that the first crystal fraction represented 139 parts by weight, the second crystal fraction 56 parts by weight, and the remaining liquid 39 parts by weight. Each portion was analyzed for epoxide content, expressed as weight per epoxy grouping (WPE), and for total and saponifiable chlorine. The results are shown in Table 4.

TABLE 4

| Material | Percent wt. of feed | Analyses | | |
|---|---|---|---|---|
| | | Sap. Cl, percent wt. | Total Cl, percent wt. | WPE |
| Feed | | 0.16 | 0.30 | 177 |
| Crystal fraction No. 1 | 59.5 | 0.08 | 0.10 | 173 |
| Crystal fraction No. 2 | 23.7 | 0.07 | 0.10 | 177 |
| Liquid fraction No. 3 | 16.8 | 0.38 | 0.70 | 204 |

It is evident from the results that the content of chlorine-containing impurities was effectively reduced to no more than 0.1% by weight in the crystallized fractions of the resin. The chlorine-containing impurities as well as materials low in epoxy content are concentrated in the remaining mother liquor.

To obtain a more highly purified product, portions of the crystals from fractions Nos. 1 and 2, described above, were combined and 133 parts by weight thereof crystallized from 500 parts of methyl alcohol, removed by filtration and washed with methyl alcohol. A crystal fraction of 100 parts was obtained. Properties of these crystals are shown in Table 5.

TABLE 5

| | |
|---|---|
| Weight per epoxide | 43.5 |
| Melting point, ° C. | 43.5 |
| Total chlorine, percent wt. | 0.03 |
| Saponifiable chlorine, percent wt. | <0.01 |
| Color, Gardner | <1 |
| Viscosity, poises at 25° C. | 40 |

The crystals obtained by this two-stage crystallization have the theoretical weight per epoxide of 170. Further evidence of their purity consisted in a sharp melting point of 43.5° C. and very low chlorine content. They were free-flowing small crystals.

EXAMPLE 4

In a manner similar to that of Example 3, three successive crystallizations were carried out on a large sample of Batch No. 2 of Table 3. The yield of purified crystals was 52% by weight on the basis of the distilled resin feedstock. Product analyses together with the analysis of the feed resin and the mother liquor concentrates are given in Table 6.

TABLE 6

| | Feed | Crystalline Resin | Mother Liquor Concentrate |
|---|---|---|---|
| Resin properties: | | | |
| Viscosity, poises at 25° C | 68 | 40 | 126 |
| Weight per epoxide | 181 | 171 | 229 |
| Color, Gardner | 1 | <1 | 2 |
| Total chlorine, percent wt | 0.37 | <0.07 | 0.96 |
| Saponifiable chlorine, percent wt | 0.23 | <0.01 | 0.31 |
| Total hydroxyl, eq./100 g | 0.03 | 0.007 | 0.14 |
| Phenolic hydroxyl, eq./100 g | 0.03 | 0.007 | 0.03 |
| Melting point, ° C | | | |
| Resin performance: | | | |
| Heat distortion temperature, ° C | 153 | 166 | 102 |
| Cure rate, $\Delta RI \times 10^4$ | 92 | 21 | 163 |

The crystals obtained in this manner were free-flowing small crystals.

EXAMPLE 5

In the crystallization of Example 4, the feed is replaced by a concentrate of about 90% diglycidyl ether of p,p'-bisphenol A obtained by extracting a crude condensate of p,p'-bisphenol A and epichlorohydrin in a multistage liquid-liquid extraction process using as solvent a mixture of one part by weight benzene with two parts n-hexane. The recovered crystalline product is similar in purity and characteristics to that described in Table 6.

I claim as my invention:

1. As a manufacture, free-flowing crystals of 2,2-bis-(2,3-epoxypropoxyphenyl)propane.

2. As a manufacture, free-flowing crystals of substantially pure 2,2-bis(2,3-epoxypropoxyphenyl)propane characterized by a sharp melting point of about 43.5° C., a weight-to-epoxide ratio of about 170 grams per gram equivalent epoxide, total chlorine content of less than 0.1 percent by weight, saponifiable chlorine content of less than 0.01 percent by weight, total hydroxyl content and phenolic hydroxyl content of less than 0.01 gram equivalents per 100 grams, each, and a viscosity, when a supercooled liquid, of less than about 40 poises at 25° C.

References Cited

UNITED STATES PATENTS

| | | | |
|---|---|---|---|
| 3,095,429 | 6/1963 | Smith | 260—348 |
| 3,142,688 | 7/1964 | Lastovica | 260—348 |
| 2,506,486 | 5/1950 | Bender et al. | 260—348.6 |
| 2,682,547 | 6/1954 | Clemens et al. | 260—348.6 |
| 2,765,322 | 10/1956 | Beauers | 260—348 |
| 2,467,171 | 4/1949 | Werner et al. | 260—348 |
| 2,530,353 | 11/1950 | Havens | 260—348 |

FOREIGN PATENTS 565,590 11/1958 Canada.

OTHER REFERENCES

Werner et al.: Rec. des Trav. Chem. de Pays Bas, vol. 67, pp. 438 to 441 (1948).

Hendry et al.: Brit. J. Pharmacol., vol. 6, p. 244 (1951).

Dearborn et al.: Ind. and Eng. Chem., vol. 45, pp. 2715–21 (1953).

Weissberger: Technique of Organic Chem., vol. III (1950), pp. 363–485.

JOHN D. RANDOLPH, *Primary Examiner.*